Sept. 1, 1970  F. PRUIM  3,526,008
LATCH AND SUPPORT ASSEMBLY FOR BED RESTRAINING SIDES
Filed Oct. 21, 1968
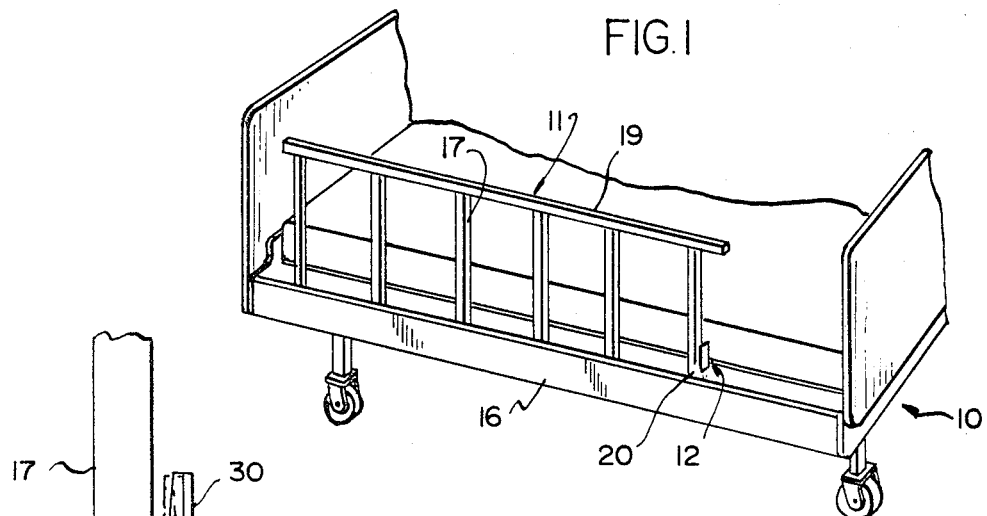
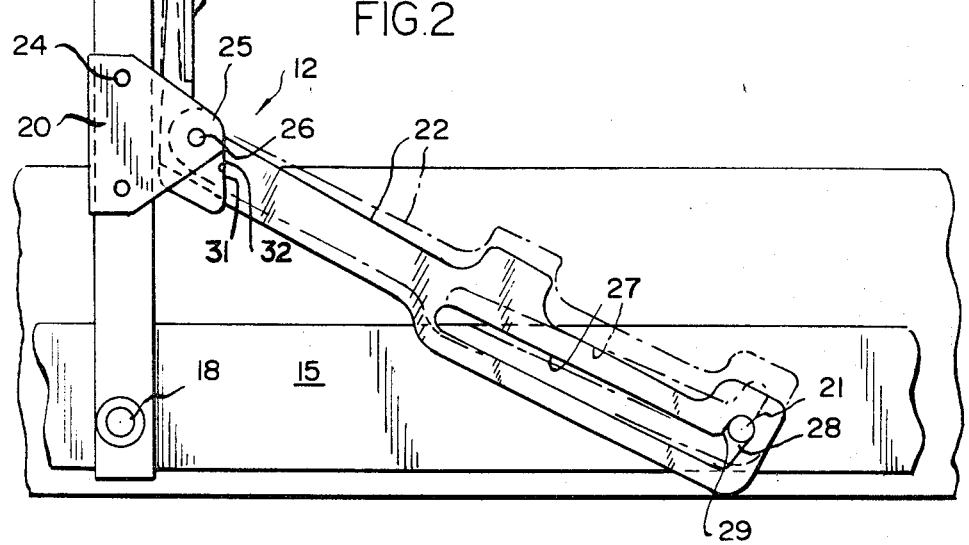
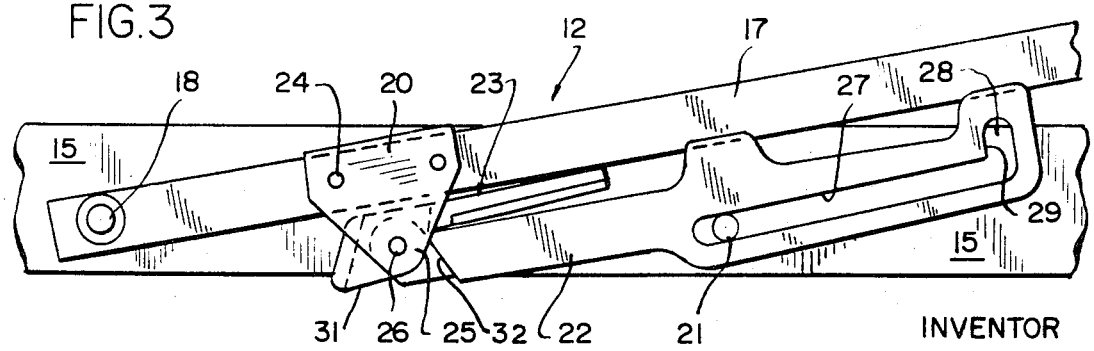
INVENTOR
FRED PRUIM
BY Evan D. Roberts
ATTORNEY United States Patent Office 3,526,008
Patented Sept. 1, 1970

3,526,008
LATCH AND SUPPORT ASSEMBLY FOR BED RESTRAINING SIDES
Fred Pruim, Chicago, Ill., assignor to Borg-Warner Corporation, Chicago, Ill., a corporation of Delaware
Filed Oct. 21, 1968, Ser. No. 769,084
Int. Cl. A47c 21/00
U.S. Cl. 5—331                                   1 Claim

ABSTRACT OF THE DISCLOSURE

A bed having collapsible restraining sides is disclosed herein and is of the general type having spaced bars connected at one end by a top rail and pivotally connected at the other end to the side rail of the bed. The restraining side collapses in a parallelogram fashion with the bars pivoting to a generally horizontal position beside the bed. The latch and supporting assembly of this invention is disclosed in conjunction with the restraining sides to provide a means for supporting the restraining sides in the up position, but which may be readily released to allow the restraining sides to be collapsed to the down position.

SUMMARY OF THE INVENTION

This invention relates to a latch and supporting assembly for restraining sides of a bed wherein a latch brace is pivotally connected to a trigger fulcrum on a bar of the restraining side and the other end of the brace is confined to longitudinal and transverse movement with respect to a pin extending from the side rail of the bed. The configuration of the brace and the slots therein are such that when the restraining sides are in the up position, the brace will coact with the pin to support the bars, and thus the restraining sides, in the up position. A trigger lever is provided which is adapted to be remotely operated with respect to the brace when the bars of the restraining sides are in the up position to cause the brace to be released from the pin whereby the brace can move with respect to the pin and allow the bar of the restraining side to be pivoted downwardly whereby the otherwise supported restraining sides can be collapsed to the down position.

The known types of latches or supporting means for restraining sides often require intricate geometric linkages and usually in cooperation with similar spring mechanisms also, it is often required that the linkages be manipulated directly to allow the collapse of the restraining sides or the like and do not provide a remote trigger arrangement for releasing the latch mechanism whereby the latch mechanism can be completely enclosed and removed from the patients access. It is, therefore, the highly desirable object of this invention to provide a latch and supporting assembly for restraining sides of a bed which does not require intricate geometrical linkages or precise spring configurations and which is provided with a remote trigger operation so that the latch and supporting assembly for the restraining sides can be readily enclosed beyond ready access.

Other advantages and novel aspects of the invention will become apparent upon consideration of the following detailed description, in conjunction with the accompanying drawings wherein:

FIG. 1 is a partial perspective view of a hospital bed having collapsible restraining sides and the latch and supporting assembly of this in position thereon;

FIG. 2 is a partial view of the side rail of the bed shown in FIG. 1 illustrating the exact position and configuration of the linkages of the latch and support assembly of this invention with the restraining sides in the up position; and FIG. 3 is a partial veiw of the side rail of the bed with the latch and supporting assembly of this invention with the restraining sides collapsed.

Referring to the drwaings, there is disclosed generally, a bed 10 having restraining sides generally designated by the numeral 11, latch and support assembly for the restraining sides 11, generally represented by the numeral 12 is shown in conjunction with the bed 10 and the collapsible restraining sides 11.

The portion of the bed 10 which is utilized for this invention is side rail 15 extending parallel to a side panel 16 and to which bars 17 of the restraining side 11 are pivotally connected by pins 18 extending through the bottom end thereof. The bars 17 of the restraining side 11 are also connected to a top rail 19 at the other end thereof so that the restraining side 11 will collapse in a parallelogram fashion along the side panel 16 and rail 15 of the bed 10.

The latch and supporting assembly 12 of this invention for the bed restraining side 11 comprises generally, among other things, a trigger fulcrum 20, a support pin 21, a latch brace 22 and a trigger lever 23. The fulcrum 20 is a U-shaped piece secured to the restraining side bar 17 by screws 24 or similar means and has two leg portions 25 extending laterally from the bars 17 with a fulcrum pin 26 positioned therethrough.

The latch brace 22 is pivotally positioned on the fulcrum pin 26 so as to be freely pivotable through a vertical plane while being urged generally downwardly or clockwise about the fulcrum pin 26 due to the weight thereof. A longitudinal slot 27 is provided in the other end of the brace 22 and is adapted to receive the support pin 21 extending horizontally from the bed rail 15. A lateral slot extension 28 of the longitudinal slot 27 is provided in the other end of the brace 22 and is also adapted to receive the support pin 21. The restraining side bars 17 can be pivoted to the down position (FIGS. 2 and 3) only when the brace 22 is positioned with respect to the pin 21 whereby the brace 22 can move with respect to the stop pin 21 with the pin 21 in the longitudinal slot 27 thereof.

When the restraining side bar 17 is moved from the down position (FIG. 3) to the up position (FIG. 2), the brace 22 will mover over the pin 21 along the longitudinal slot 27 until the pin 21 is in the lower end thereof to the broken line position (FIG. 2) whereupon gravity will urge the brace 22 clockwise or downwardly causing the lateral slot 28 thereof to move over the pin 21 from the broken line position (FIG. 2) to the position shown. The side 29 of the lateral slot 28 of the brace 22 will thereupon prevent movement of the brace 22 with respect to the pin 21. Accordingly, the bar 17 of the restraining side 11 will be locked into the up position (FIG. 2).

The trigger lever 23 is provided for releasing the brace 22 from the locked position (FIG. 2) just described. The trigger 23 is pivotally mounted on the fulcrum pin 26 and has a manual actuating arm 30 extending upwardly to facilitate manual pivoting of the trigger 23 counterclockwise about the fulcrum pin 26. The trigger 23 is provided with a surface 31 adapted to engage a diagonal surface 32 on one or both sides of the brace 22 when the restraining side bar 17 is up and the brace is in the locked position (FIG. 2).

When the actuating arm of the trigger 23 is moved to the left, the trigger 23 is moved counterclockwise about the fulcrum pin 26 and the surface 31 thereof will be caused to engage the brace 22 pivoting the brace counterclockwise about the fulcrum pin 26 to move the brace 22 over the support pin 21 in slot 29 to the broken line position where the support pin 21 is free to move longitudinally within the longitudinal slot 27 of the brace. The restraining side bar 17 can then be pivoted clockwise as the trigger 23 is urged counterclockwise and the brace 22 will move over the pin 21 to allow the restraining side 11 to collapse to a position adjacent the bed rail 15 (FIG. 3).

It is to be understood that the invention is not to be limited to the specific constructions and arrangements shown and described, as it will be understood to those skilled in the art that changes may be made without departing from the principles of the invention.

What is claimed is:

1. A latch and support assembly for bed restraining sides of the general type having bars pivotally connected at one end of the side of the bed comprising a trigger fulcrum having a horizontal pivot axis and secured to one of the bars at a predetermined distance from the pivot axis of the bar, a support pin secured to the bed side and extended horizontally therefrom, said brace having a slot extending longitudinally from the other end thereof and adapted to slidably receive said support pin for longitudinal movement therein to allow the bar to be pivoted on said bed toward the pin and between an upright and a down position, said brace having a lateral extension of said slot at the other end thereof for receiving said pin to allow the other end of said brace to move laterally downwardly under the effects of gravity and over said pin when the bar is in the upright position for releasably locking said brace against longitudinal movement with respect to said pin and to thereby lock the bar in the upright position, and a trigger lever pivotally secured to said fulcrum and adapted to engage said brace when the bar is in the upright position for pivoting said brace over said pin to the longitudinal slot to allow pivotal movement of the bar toward said pin.

References Cited

UNITED STATES PATENTS

| 215,040 | 5/1879 | Bostwick et al. | 5—331 XR |
| 3,093,839 | 6/1963 | Higgins | 5—331 |
| 3,336,609 | 8/1967 | Taylor | 5—331 |

BOBBY R. GAY, Primary Examiner

A. M. CALVERT, Assistant Examiner

U.S. Cl. X.R.

5—100